March 26, 1929.  G. A. EYNON  1,706,845
FUEL SEPARATOR AND VAPORIZER
Filed Nov. 27, 1922
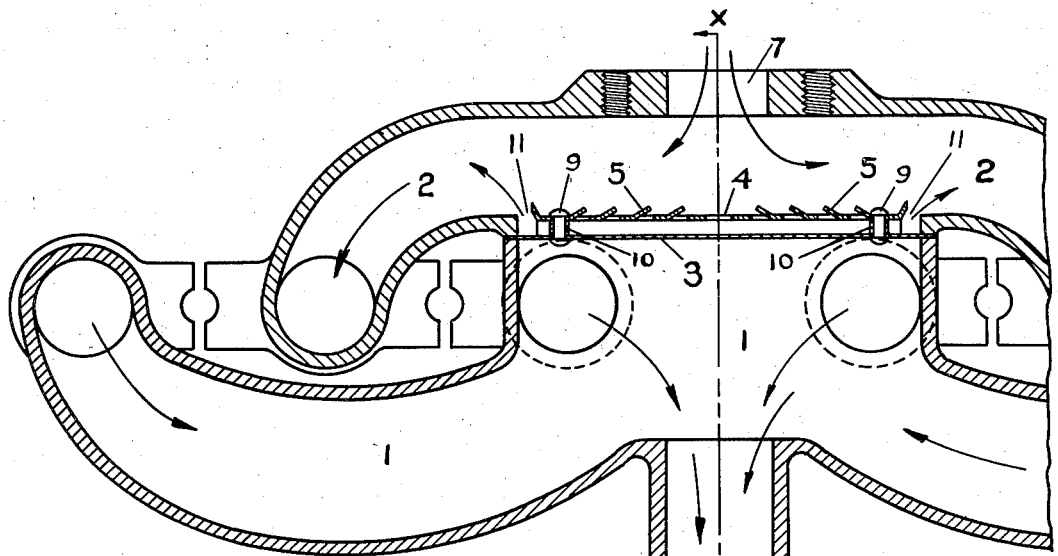
FIG. I
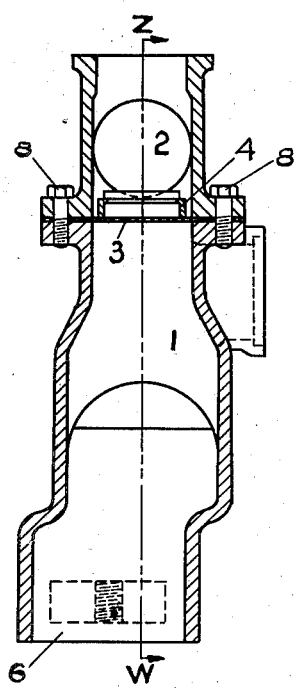
FIG. II
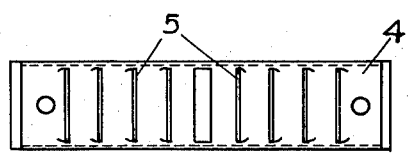
FIG. III
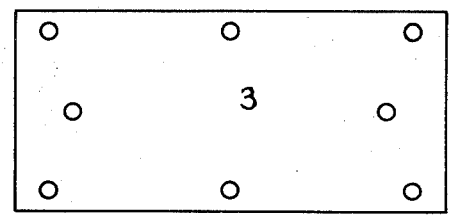
FIG. IV
GEORGE A. EYNON
INVENTOR.
BY
Stanley M. Udale
ATTORNEY.

Patented Mar. 26, 1929.

1,706,845

UNITED STATES PATENT OFFICE.

GEORGE A. EYNON, OF DETROIT, MICHIGAN, ASSIGNOR TO GEORGE M. HOLLEY, OF DETROIT, MICHIGAN.

FUEL SEPARATOR AND VAPORIZER.

Application filed November 27, 1922. Serial No. 603,541.

This invention relates to externally heated oil fuel vaporizers. The vaporizer is intended to be used in conjunction with an internal combustion engine and to be heated by the exhaust gases therefrom.

The object of this invention is generally to provide improved means whereby any unvaporized fuel entrained in a stream of air is automatically thrown out of suspension and deposited on to a surface heated preferably by the exhaust gases.

Specifically this invention provides means for preventing the air and vaporized fuel from cooling the vaporizing surface so that the vaporizing surface may be utilized solely for its intended purpose, i. e., vaporizing the unvaporized fuel. Incidentally the overheating of the air and vaporized fuel is avoided.

Another object is to provide means for quickly raising the temperature of the vaporizer by making the vaporizing surface consist of a thin metal sheet which is easily cleaned and cheaply renewed.

Figure I shows a cross sectional elevation on the plane W—Z of Figures II and shows inlet and exhaust manifolds assembled as in actual use.

Figure II shows a transverse section taken on the line X—Y of Figure I.

Figure III shows in plan the separator or deflecting screen.

Figure IV shows in plan the thin metal plate which constitutes the vaporizing surface.

*Description.*—1 is the exhaust manifold. 2 is the inlet manifold superimposed thereon. 3 is a plate preferably made of Monel metal .011" thick. This plate is bolted between the exhaust manifold 1 and the inlet manifold 2 as shown in Figure II, the cap screws 8 serving to lock the plate 3 in position. 4 is the separator or deflecting screen provided with projecting ears or louvers 5 which serve to catch and direct the unvaporized fuel whereby it is thrown against the heated plate 3. This separator or deflecting screen 4 is preferably made of a brass sheet .011" thick, the ears or louvers being stamped out. The separator 4 and the plate 3 are riveted together by rivets 9 and held a definite distance apart (e. g. $\frac{7}{32}$") by means of the cylindrical spacers 10. 6 is the outlet from the exhaust manifold 1. 7 is the entrance to the inlet manifold 2 to which may be bolted any form of fuel mixer or carbureting device. Openings 11 are provided at each end between the plate 4 and the plate 3, which serve as the outlet for the vaporized fuel.

*Operation.*—A mixture of air and fuel more or less vaporized is drawn in to the inlet manifold at 7. The mixture follows the arrows and in doing so fuel carried in suspension is thrown against the louvers 5 but the separator 4 prevents the main body of the air contacting with and cooling the heated plate 3. The condensed fuel spreads over the plate 3 where it is vaporized by the exhaust gases in the exhaust manifold 1. The vaporized fuel which rises from the plate 3 is drawn into the main air stream through the outlets 11 and so carried into the engine ports.

*Cleaning.*—To clean the vaporizer the screws 8 are removed and the manifold bolts are loosened. The inlet manifold is raised and the plate 3 and screen 5 are removed. The carbon is easily removed or a new plate or screen is easily substituted when the dirty plate can be cleaned at leisure.

What I claim is:

1. A fuel separator and vaporizer, comprising an exhaust conduit, an inlet manifold adjacent thereto and having a substantially horizontal passage, a mixture entrance at right angles to said horizontal passage, a vaporizer located opposite to and below said mixture entrance comprising a thin renewable metal plate forming a partition between the inlet manifold and the exhaust conduit, a plurality of deflecting louvers located adjacent said plate and adapted to deflect the major portion of the fuel and a minor fraction of the air over said metal plate for the purpose described.

2. A fuel separator and vaporizer, comprising an exhaust conduit, an inlet manifold adjacent thereto and having a substantially horizontal passage, a mixture entrance at right angles to said horizontal passage, a vaporizer located opposite to and below said mixture entrance comprising a thin metal plate forming a partition between the inlet manifold and the exhaust conduit, a plurality of deflecting louvers located adjacent said plate and adapted to deflect the major portion of the fuel and a minor fraction of the air over said metal plate for the purpose described.

In testimony whereof I affix my signature.

GEORGE A. EYNON.